United States Patent [19]

O'Neill

[11] Patent Number: 4,643,155

[45] Date of Patent: Feb. 17, 1987

[54] VARIABLE STROKE, ELECTRONICALLY CONTROLLED FUEL INJECTION CONTROL SYSTEM

[75] Inventor: Cormac G. O'Neill, Walnut Creek, Calif.

[73] Assignee: Olin Corporation, Stamford, Conn.

[21] Appl. No.: 658,264

[22] Filed: Oct. 5, 1984

[51] Int. Cl.⁴ .................................... F02M 39/00
[52] U.S. Cl. .............................. 123/506; 123/496; 123/500
[58] Field of Search .............. 123/506, 496, 494, 500, 123/501, 357, 458, 495; 73/119 A

[56] References Cited

U.S. PATENT DOCUMENTS

| | | | |
|---|---|---|---|
| 3,661,130 | 5/1972 | Eheim | 123/358 |
| 3,903,852 | 9/1975 | Sola | 123/357 |
| 4,011,474 | 3/1977 | O'Neill | 310/8.7 |
| 4,158,305 | 6/1979 | Shipley | 73/119 A |
| 4,174,694 | 11/1979 | Wessel et al. | 123/357 |
| 4,211,202 | 7/1980 | Hafner | 123/495 |
| 4,223,654 | 9/1980 | Wessel | 123/358 |
| 4,265,200 | 5/1981 | Wessel et al. | 123/501 |
| 4,294,211 | 10/1981 | Stummpp et al. | 123/379 |
| 4,304,205 | 12/1981 | Bauer et al. | 123/502 |
| 4,329,951 | 1/1982 | Seilly | 123/179 L |
| 4,354,380 | 10/1982 | Morata | 73/119 A |
| 4,384,560 | 5/1983 | Juger et al. | 123/383 |
| 4,388,908 | 6/1983 | Babitzka | 123/500 |
| 4,417,554 | 11/1983 | Dinger | 123/357 |
| 4,432,327 | 2/1984 | Salzgeber | 123/502 |
| 4,462,361 | 7/1984 | Karle | 123/494 |
| 4,480,619 | 11/1984 | Igashira | 123/458 |

FOREIGN PATENT DOCUMENTS

| | | | |
|---|---|---|---|
| 542956 | 2/1942 | United Kingdom | 123/383 |
| 2013275B | 6/1982 | United Kingdom | 123/506 |

Primary Examiner—Carl Stuart Miller
Attorney, Agent, or Firm—Bruce E. Burdick

[57] ABSTRACT

A fuel injection control system for an internal combustion engine utilizes a fuel injection pump in which the pump cylinder is in fluid communication with the fuel injection nozzle and a piezoelectric actuated spill valve. A cam drive actuates the pump piston to achieve a constant velocity during the pumping cycle (constant velocity relative to degrees of rotation of the engine crankshaft). An index wheel connected to either the engine crankshaft or the pump camshaft is used in conjunction with an initial position detector, angular position detector and a pump control unit to close and open the spill valve at predetermine positions of the pump piston during the pumping cycle. The pump control unit includes a computer connected to various engine parameter transducers to adjust the closing and opening of the spill valve to achieve a desired fuel injection volume.

6 Claims, 5 Drawing Figures

VARIABLE STROKE, ELECTRONICALLY CONTROLLED FUEL INJECTION CONTROL SYSTEM

BACKGROUND OF THE PRIOR ART

This invention relates generally to internal combustion engine fuel injection systems and in particular to fuel injection systems utilizing spill valves to control the quantity and timing of injection of fuel.

In some fuel injection systems of the prior art two valves are used, one to initiate fuel injection and the other to terminate fuel injection. Such configurations were required because of the inertia of the valve elements and the high operating speeds of the valves, of the order of $10^{-3}$ seconds. The valve used for initiating the start of injection is generally fuel pressure operated.

Another fuel injection system utilizes a solenoid operated spill valve to control fuel flow to a fuel injection nozzle, however, without disclosing any method of relating control of the valve to engine operating parameters.

Other fuel injection systems utilize solenoid operated fuel pump/injectors only.

Still other injection systems utilize variable volume fuel injection pumps to control the amount of fuel injected into the internal combustion engine.

SUMMARY OF THE INVENTION

The fuel injection system of the present invention comprises, basically, an internal combustion engine having a crankshaft combined with an electromechanically-actuated spill valve in fluid communication with a fuel tank, a fuel injection nozzle and piston-and-cylinder fuel injection pump, the piston of the fuel injection pump being driven at a constant velocity, and the electromechanically actuated spill valve being controlled to open and close at predetermined positions of the fuel pump piston whereby fuel is injection into the engine through the fuel injection nozzle when the spill valve is closed and not injected when the spill valve is open.

An index wheel connected to either the crankshaft or the camshaft is used to in conjunction with an initial position detector and an angular position detector to determine piston position.

A pump control unit utilizing a data acquisition module receives information concerning various engine parameters to determine at which fuel pump piston positions to close and open the spill valve.

A computer containing empirical engine performance data is used as a reference to correct theoretical fuel requirements to actual fuel requirements for various engine speeds and operating conditions.

It is, therefore, an object of the present invention to provide a fuel injection system for an internal combustion engine in which an electromechanically actuated spill valve controls the time of injection of fuel injected into an internal combustion engine.

It is a further object of the present invention for provide a fuel injection system in which engine parameters are compared with a data table and the results are used to control the onset of fuel injection and the termination of fuel injection.

It is yet another object of the present invention to provide a fuel injection system for an internal combustion engine in which a constant velocity fuel pump is used in which the onset and termination of fuel injection is measured according to fuel pump piston position.

It is a further object of the present invention to provide a fuel injection system for an internal combustion engine in which the piston of the constant velocity fuel pump is driven at a velocity that is constant relative to units of angular rotation of the engine crankshaft for a major portion of the piston stroke.

It is a further object of the present invention to provide a fuel injection system for an internal combustion engine in which an index wheel connected to the crankshaft or camshaft is provided with indicia to measure initial angular position and angular position from the initial position in order to establish a predetermined angular position for onset and termination of fuel injection.

These and other objects of the present invention will become manifest upon study of the following detailed description when taken together with the drawings.

DESCRIPTION OF THE PREFERRED EMBODIMENT

Figure 1:
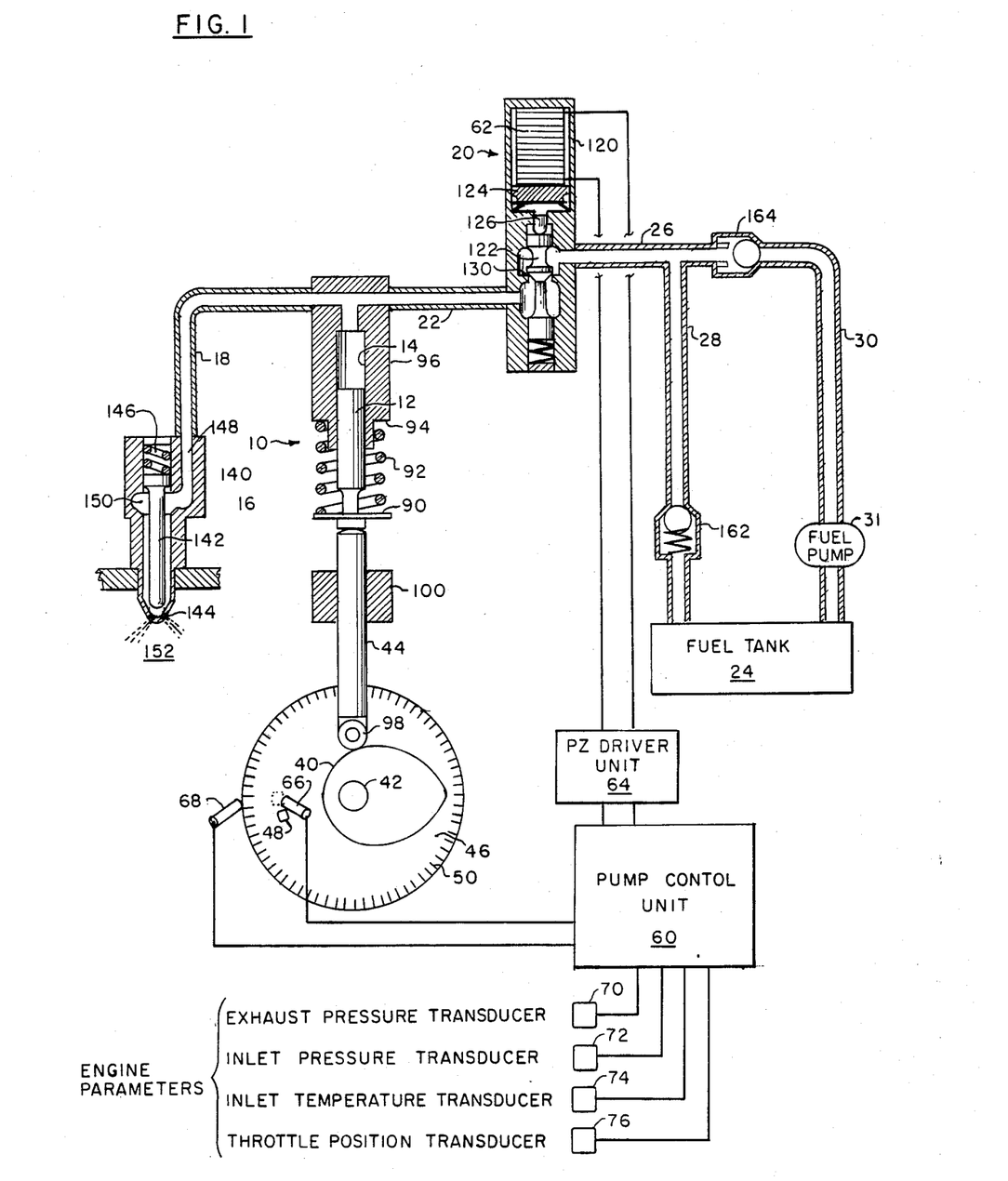
FIG. 1 is a schematic drawing of the basic apparatus combination of the present invention showing the mechanical and electrical interconnection of the various elements of the fuel injection system.

With reference to FIG. 1, there is illustrated a generally schematic diagram of the fuel injection system of the present invention comprising, basically, a fuel injection pump 10 having a piston 12 containing a cylinder 14 in fluid communication with fuel injection nozzle 16 by way of conduit 18, and also in fluid communication with piezoelectric actuated spill valve 20 by way of conduit 22.

Spill valve 20 is, in turn, in fluid communication with fuel tank 24 through conduit 26 which is connected to conduits 28 and 30.

A fuel supply pump 31 is provided in conduit 30 to pump fuel at a relatively low pressure, 60–100 psi, to spill valve 20.

Piston 12 of fuel pump 10 is actuated by cam 40, attached to camshaft 42, in conjunction with cam follower 44. The contour of cam 40 is such as to drive piston 12 at a constant velocity within cylinder 14 relative to angular rotation of camshaft 42.

Camshaft 42 is, in turn, connected to the engine drive shaft (not show) in a well known manner. For a four-cycle internal combustion engine, the camshaft is driven at half engine crankshaft speed. For a two-cycle internal combustion engine, the camshaft is driven at engine crankshaft speed.

Attached to camshaft 42 is index wheel 46 on which is marked with starting point indicia 48 and angular indicia 50.

Although index wheel 46 is shown attached to camshaft 42, it can also be attached to the engine drive shaft (not shown). If attached to the engine driveshaft, only one starting point indicia is required for each engine operating cycle. When attached to camshaft 42, one starting point indicia can be used but with the precaution that it represents a period of two engine cycles when used on a four-cycle internal combustion engine.

If index wheel 46 is attached to the crankshaft of a four cycle engine, a separate half-speed drive is required to time the starting point indicia.

If the engine is a two cycle operation, then the index wheel can be connected directly to the engine crankshaft.

For this reason, one cannot use the crankshaft of a four cycle engine to determine the stroke that the engine is engaged in at any instant. One must have a half speed drive to do this.

Figure 2:
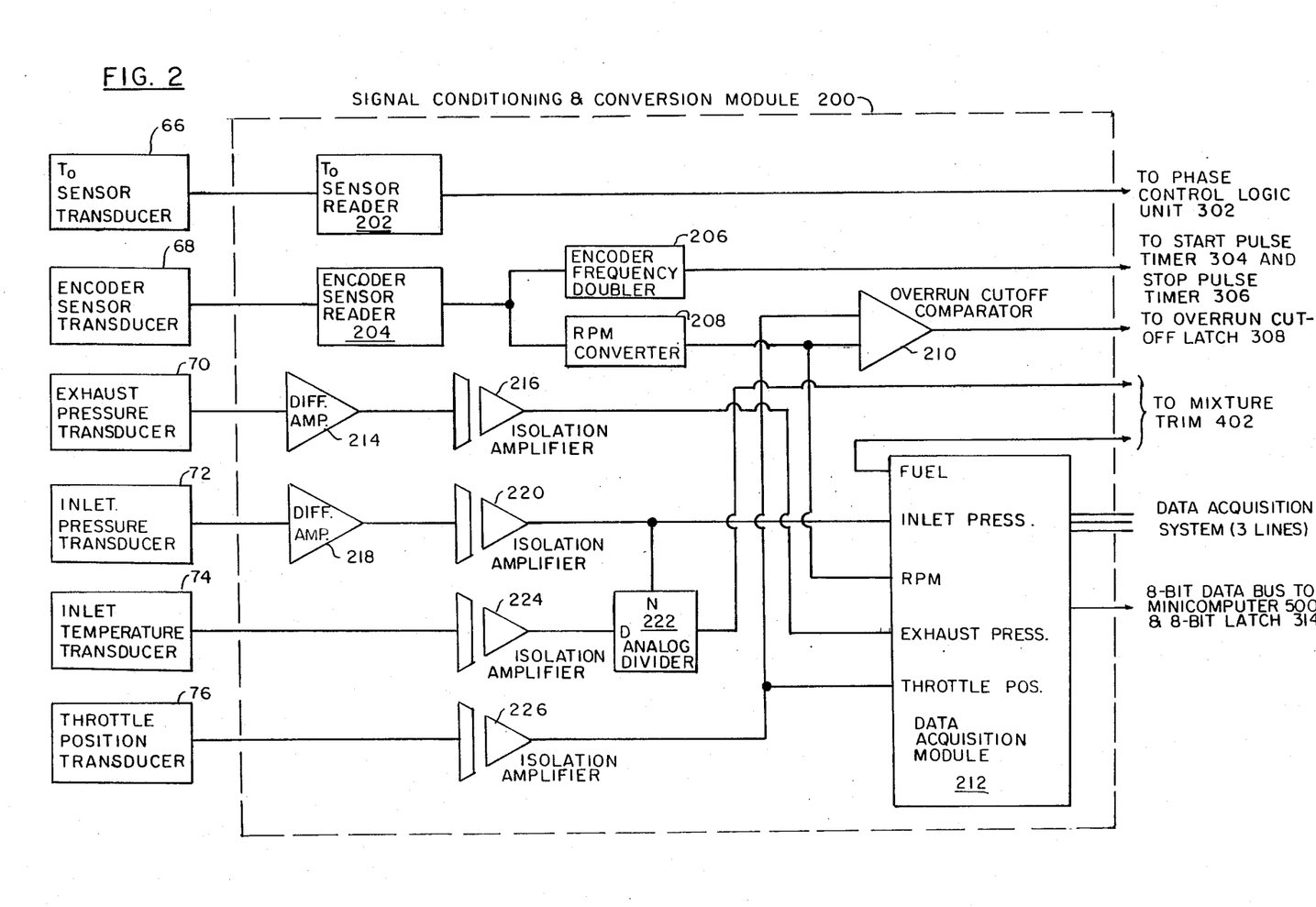
FIG. 2 is a schematic block diagram of a first half of the pump control unit, namely, the signal conditioning and conversion module.

However, if the index wheel which angular indicies is attached to the camshaft, then a frequency doubler is required to indicate crankshaft degrees (as required by the system). Such is the function of frequency doubler 206 (FIG. 2).

The fuel injection system of FIG. 1 further comprises a pump control unit 60 which is electrically connected to piezoelectric stack 62 of piezoelectric spill valve 20 through PZ driver unit 64. Pump control unit 60 comprises the elements shown in FIGS. 2 and 3, namely, signal conditioning and conversion module 200, injection and timing module 300, remote monitor module 400 and minicomputer 500.

Pump control unit 60 is also electrically connected to zero or initial position detector 66 and angular position detector 68.

In addition, pump control unit 60 is also connected to various engine parameter transducers, namely, exhaust pressure transducer 70, inlet pressure transducer 72, inlet temperature transducer 74 and throttle position transducer 76. All of these transducers are connected to the internal combustion engine (not shown) in a known manner to obtain the data indicated.

For the purpose of explanation, the injection system of FIG. 1 illustrates a system applied to one cylinder of an internal combustion engine. For a four cylinder engine, four injections systems identical to the system shown in FIG. 1 will be required with appropriate changes in time of operation from each other to accommodate the various firing cycles.

With respect to fuel injection pump 10, it will be noted that the bottom end of piston 12 is provided with washer or end plate 90 which is adapted to engage the lower end of helical spring 92. The upper end of spring 92 is biased against shoulder 94 turned down from housing 96. The bottom end of piston 12 is adapted to engage the top end of cam follower 44. The bottom end of cam follower 44 is provided with a contact face or an antifriction roller 98 which engages cam 40. Cam follower guide 100 is used to restrict cam follower 44 to a vertical reciprocating motion.

Electromechanical spill valve 20 comprises, basically, a housing 120 containing a piezoelectric stack 62 adapted to move poppet valve 122 to close and open the valve.

In spill valve 20, piezoelectric stack 62 acts upon large diameter piston 124 to amplify the piezoelectric stack motion and drive small diameter piston 126 which, in turn, drives or actuates poppet valve member 122 in a downward direction within housing 120. A spring 128 biased against the bottom of poppet valve member 122 is used to urge poppet valve member 122 in an upward direction in opposition to the downward direction caused by piezoelectric stack 62.

A shown in FIG. 1, spill valve member 122 is shown in the closed position resting against valve seat 130.

Depending upon the design of piezoelectric stack 62, the valve can be either normally open or normally closed when not energized. In the present case, however, when the piezoelectric stack is not energized, poppet valve 122 will remain open.

By way of example, piezoelectric spill valve 20 can utilize a construction for its electroexpansive driving element a piezoelectric stack of design and assembly technique similar to that disclosed in U.S. Pat. No. 4,011,474 or U.S. Pat. No. 3,753,426.

Fuel injection nozzle 16 can be any fuel injection nozzle having a configuration including a housing containing a plunger 142 biased against ejection ports 144 by a spring member 146. Fuel from conduit 18 enters housing 140 through port 148 into chamber 150. When the pressure of the fuel reaches a predetermined pressure sufficient to counteract the bias of spring 146 and lift plunger 142 away from ejection ports 144, the fuel will be injected into internal combustion engine cylinder 152 to be ignited and perform useful work.

Figure 3:
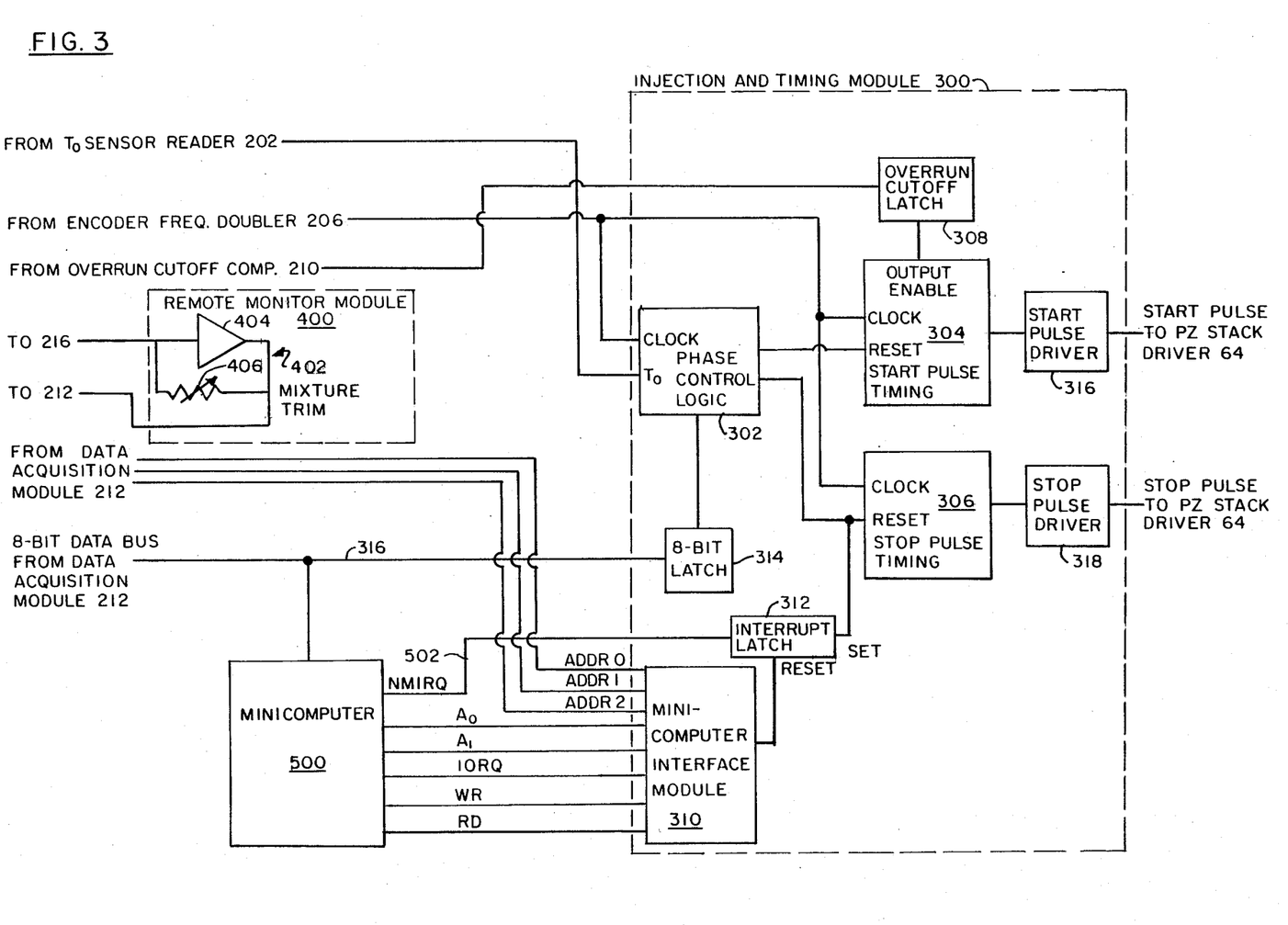
FIG. 3 is a schematic block diagram of the second half of the pump control unit, namely, the remote monitor module and the injection and timing module.

The apparatus for controlling the opening and closing spill valve 20, namely, pump control unit 60 is illustrated in FIG. 2 and 3.

Pump control unit 60 comprises, basically, signal condition and conversion module 200, injection and timing module 300, remote monitor module 400 and minicomputer 500.

FIG. 2 is a block diagram of signal conditioning and conversion module 200 while FIG. 3 illustrates a block diagram of injection and timing module 300 interconnected with a block diagram of remote monitor module 400 with minicomputer 500.

Interconnection of signal conditioning and conversion module 200 with injection and timing module 300, remote monitor module 400 and minicomputer 500 is shown at the right and left side, respectively, of FIGS. 2 and 3.

With respect to FIG. 2, signal condition and conversion module 200 comprises, basically, a $T_0$ or initial position sensor transducer reader 202 connected on its input side to $T_0$ or initial position sensor transducer 66 (FIG. 1) and on its output side to phase control logic unit 302; an encoder sensor reader 204 connected on its input side to encoder sensor transducer 68 (FIG. 1) and on its output side connected to the input side of encoder frequency doubler 206 whose output side is connected to start pulse timer 304 and stop pulse times 306 (FIG. 3). Encoder sensor reader 204 is also connected on its output side to the input side of RPM converter 208 whose output side is connected to one input side of overrun cutoff comparator 210 and the RPM input port of data acquisition module 212.

$T_0$ or initial position sensor 66 and encoder sensor 68 can comprise any optical device common in the art for detecting indicia. Such a device might include a photocell that detects light and dark indicia. It might also include a photocell that detects light passing through apertures corresponding to indicia marks. It might also include a magnetic detector capable of detecting magnetic indicia, all of which are well known in the art.

Exhaust pressure transducer 70 is also connected to the exhaust pressure port of data acquisition module 212 through differential amplifier 214 and isolation amplifier 216.

Inlet pressure transducer 72 is also connected, through differential amplifier 218 and isolation amplifier 220, to the initial pressure port of data acquisition module 212 and to the "N" port of analog divider 222 with inlet temperature transducer 76 connected to the "D" port of analog divider 222 through isolation amplifier 224. The output side of analog divider 222 is connected to mixture trim 402 of remote monitor module 400 (FIG. 3).

Throttle position transducer 76 is connected to the throttle position port of data acquisition module 212 and also connected to the other input side of overrun cutoff comparator 210.

With reference to FIG. 3, injection and timing module 300 comprises phase control logic 302 whose "$T_0$" input side is connected to the output side of initial position sensor reader 202 and whose "clock" input side is connected to the output side of encoder frequency doubler 206. One output side of phase control logic 302 is connected to the reset port of start pulse timing unit 304 while the other output side of phase control logic 302 is connected to the reset port of stop pulse timing unit 306.

Injection and timing module 300 also comprises an overrun cutoff latch whose input side is connected to the output side of overrun comparator 210 (FIG. 2) and whose output side is connected to the "output enable" side of start pulse timing unit 304.

Also included as a part of injection and timing module 300 is minicomputer interface module 310 whose input side is connected to various control outputs of minicomputer 500 and 3 address control ports of data acquisition module 212 (FIG. 2). The output side of minicomputer interface module 310 is connected to the "reset" port of interrupt latch 312 whose input side is connected to the "NMIRQ" (non-maskable interrupt request) signal line of minicomputer 500 and whose "set" port is connected to the "reset" port of stop pulse timing unit 306.

Also included in injection and timing module 300 is 8 bit latch 314 whose input side in connected to data acquisition module 212 through 8 bit data bus 316 (also connected to minicomputer 500) and whose output side is connected to a control port of phase control logic 302.

Figure 4:
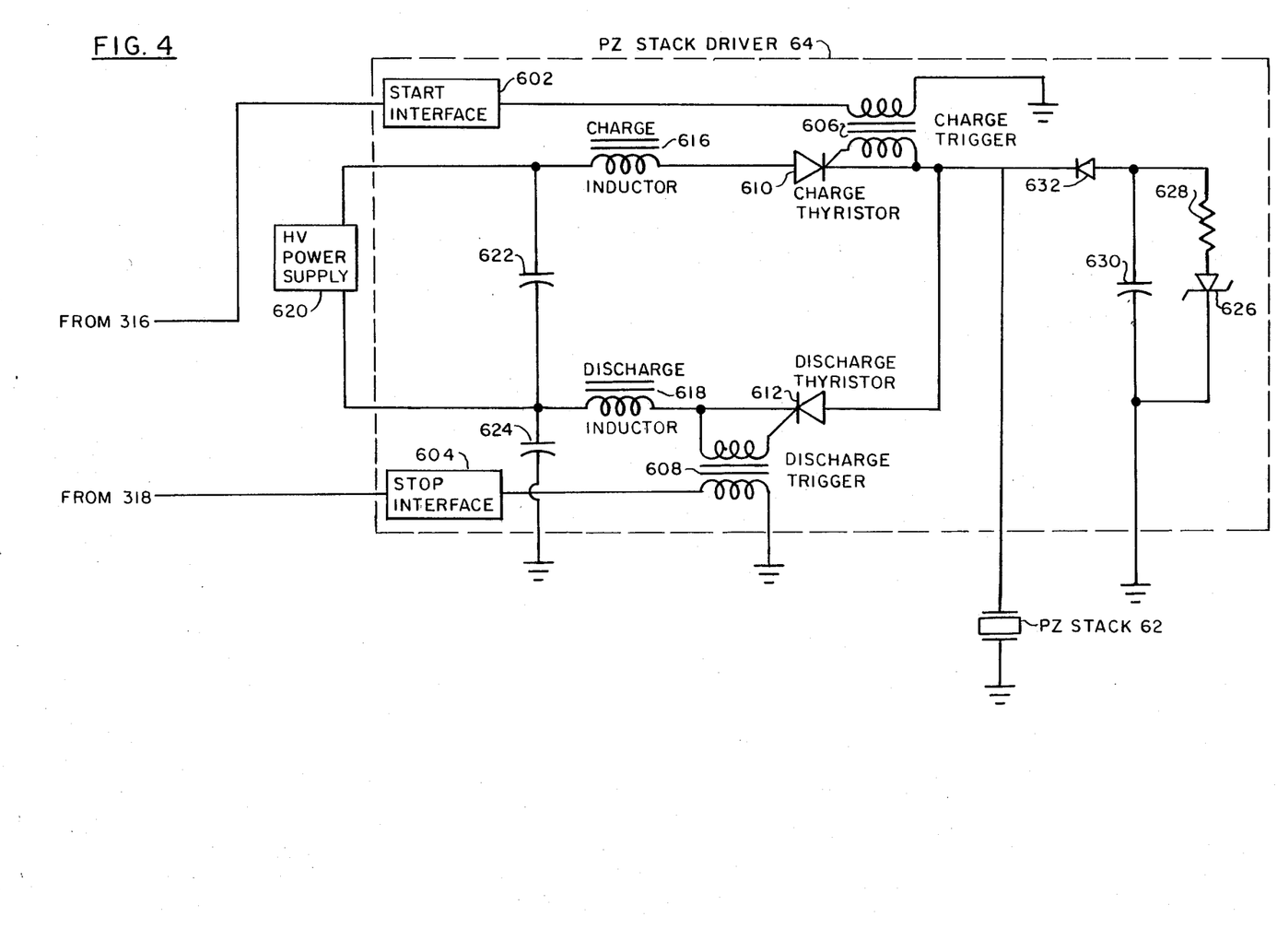
FIG. 4 is a circuit diagram of a typical piezoelectric driver circuit used to energize the electromechanical spill valve.

Also included in injection and timing module 300 is start pulse driver 316 whose input side is connected to the output side of start pulse timing unit 304 and whose output side is connected to PZ stack drive 64 (FIG. 4). In a like manner injection and timing module 300 also includes stop pulse driver 314 whose input side is connected to the output side of stop pulse timer 306 and whose output side is connected to PZ stack driver 64 (FIG. 4).

Remote monitor module 400 comprises, simply, mixture trim circuit 402 comprising signal amplifier 402 whose input side is connected to the output side of analog divider 222 (FIG. 2) and one side of potentiometer or variable resistor 406. The output side of signal amplifier 404 is connected to the other side of potentiometer or variable resistor 406 and to the "fuel" port of data acquisition module 212.

With respect to FIG. 4, there is illustrated a typical PZ stack drive module 64 comprising, basically, start interface 602 and stop interface 604 connected, respectively, to start trigger transformer 606 and stop trigger transformer 608, which are, in turn, connected, respectively, to the gate of charging thyristor 610 and discharging thyristor 612 which are in turn connected, respectively, to charge inductor 616 and discharge inductor 618 serially with each side of power supply 620. A charging capacity 622 is connected across the power supply terminals with a second capacitor 624 connecting the terminal of the power supply connected to discharge inductance 618 to ground. The cathode side of charging thyristor 610 and the anode of discharging thyristor 612 are both connected to the high voltage side of piezoelectric stack 62 of spill valve 20 with the other side of PZ stack 62 connected to ground. A zener diode 626, connected in series with a resistor 628 and with that combination connected in parallel with capacitor 630, is also connected, on one side to ground and on the other side to the high voltage side of PZ stack 62 through diode 632.

The PZ stack drive module 64 shown in FIG. 4 is typical of the circuit used to drive electroexpansively actuated spill valve 20 for only one cylinder of a typical fuel injection internal combustion engine well known in the art. Identical circuits will be required for spill valves used with other cylinders. Power supply 620 is adapted to provide, typically, a 450 volt potential across capacitor 622 and thyristors 610 and 612. This provision charges capacitor 622.

When triggered by triggering transformers 606 and 608, thyristors 610 and 612 will conduct in order to charge or discharge PZ stack 62 as required.

PZ stack 62 is charged resonantly through charge inductor 616 to approximately 1.8 times the supply voltage.

When PZ stack 82 performs work in closing poppet valve 122, its voltage drops. From this lower potential it would not be possible to discharge stack 62 into capacitor 622 since the stack voltage would not ring down to zero. Consequently, PZ stack 62 is discharged into capacitor 624 initially at zero volts but after a few cycles of discharge, building up to about 250 volts.

This return energy reduces the power requirement of PZ stack 62 and causes the discharge voltage to ring down to a negative value. The amplitude of the negative swing is limited by clamping zener diode 626 that conducts when voltage on capacitor 630 exceeds 150 volts. This provision results in an available voltage swing on PZ stack 62 of $-150$ to $+1200$ volts. The rise and fall times of PZ stack 62 voltage are controlled by the values of inductances 616 and 618.

Operation

With reference to FIG. 1, it is basically the purpose of the fuel injection system of the present invention to digitally meter the fuel injected into the engine through fuel injection pump 10 and fuel injection nozzle 18 by use the pulsed or digital signal as the basis for control of the starting and stopping of injection.

In operation, cam shaft 42 with attached cam 40 and index wheel 46 rotate in the direction of arrow 160.

As shown in FIG. 1, piston 12 is about half way through its upward travel and $T_0$ or initial position market or indicia 48 is about 10 degrees past $T_0$ or initial position detector 60.

At 90 degrees rotation of camshaft 42 after $T_0$, the piston should be almost at the top of its stroke since the total upward duration in degrees is about 130 degrees camshaft.

Electromechanically actuated spill valve 20 is shown in the closed position so that the only path the fuel can following is through conduit 18, into inlet port 148 of injector nozzle 16, then into plenum 150 where the fuel pressure will act upon fuel injection plunger 142 against the bias of spring 146 to cause it to be raised and open fuel injection ports 144 causing the fuel to be sprayed into engine cylinder 152.

At some further angular rotation of index wheel 46, depending upon the values of various engine parameters, pump control unit 60 will send a signal through PZ driver unit 64 to deenergize piezoelectric stack 62 causing spill valve 20 to open. When this occurs, pressure in conduit 18 and injection nozzle 18 will be reduced causing plunger 142 to seat on fuel injection ports 144 because of the bias of spring 46 and stop the flow of fuel into cylinder 152. The fuel now follows a path through conduit 22, through spill valve 20 and into conduits 26 and 28, through spring loaded valve 162 and into fuel tank 24.

As camshaft 42, cam 40 and index wheel 46 continue to rotate and cam follower 44 and piston 12 reach their top position and start to descend, fuel will then be drawing into fuel pump cylinder 14 through open spill valve 20 being pulled up from fuel tank 24 through conduit 30, through non-return check valve 164, through conduit 26 into spill valve 20 and through conduit 22.

Upon reaching the bottom position of the pumping cycle, the direction of piston 12 is reversed and starts to move upwardly. After a short period of acceleration, piston 12 settles to a constant velocity and at some predetermined position electromechanically actuated spill valve 20 is closed and the fuel injection cycle is repeated.

With respect to spill valve 20, the driving element can be any electroexpansive actuator operating on electromagnetic, piezoelectric or magnetostrictive principles. By way of example but not a limitation, the piezoelectric driver element illustrated utilizes a configuration disclosed in U.S. Pat. No. 4,011,474.

Since piezoelectric stack 62 produces very little displacement with large force, a motion amplifier is employed in which large diameter piston 124 drives a small diameter piston 126 utilizing an incompressible fluid such as the fuel being pumped. The small diameter piston 126 bears upon the top of poppet valve 122 such that when the piezoelectric stack is energized, plunger 126 displaces valve 122 against the bias of spring 128 to close valve 122 against seat 130.

It should be noted that poppet valve 122 can be of a pressure balanced design, common in the art, having equal areas exposed to the applied and controlled pressures.

It will again be noted that fuel injection pump 10 is driven at half crankshaft speed in a four-cycle engine and at crankshaft speed in a two-cycle engine.

Timing index wheel 46, attached to camshaft 42, is arranged so that a $T_0$ or initial indicator signal is generated once per engine cycle (i.e. every two revolutions on a 4-cycle engine or once every revolution on a 2-cycle engine).

This marker acts as a datum from which rotation may be counted for the purpose of timing the angle at which injection starts in one mode (or injection terminates in another mode) for each cylinder.

To register fine resolution in crankshaft rotation, a track of indicia 50 at one degree intervals (or two degree intervals with an interval splitter) is carried on indicia wheel 46 along with $T_0$ or initial position indicia 48. Separate sensor transducers 60 and 68 record, respectively, $T_0$ (initial position) and degrees of rotation from $T_0$.

As shown in FIG. 1, the indicia marks are spaced at 5 degree intervals for clarity. It would be possible to use only the single indicia mark along with a frequency generator to divide the crankshaft or camshaft revolution into any number of time-spaced divisions corresponding to angular divisions. For example, an analog voltage corresponding to RPM could be used to drive a variable frequency pulse generator such that each revolution of the crankshaft would result in the same number of pulses per revolution. This would be equivalent to an index wheel having a fixed number of divisions or pulses per revolution.

As shown in FIG. 1, $T_0$ indicia 48 is positioned to correspond with the start of the constant velocity motion of piston 12 which should be about 100 degrees before the top of the cam.

With reference to FIG. 2, as indicia 48 passes in view of or is otherwise detected by $T_0$ or initial position sensor transducer 66, a signal is sent to $T_0$ or initial position sensor reader 202 whose output signal is transmitted to "$T_0$" input port of phase control logic 302 (FIG. 3).

As index wheel 46 continues to rotate and as indicia 50 pass in view of or are otherwise detected by encoder sensor transducer 68, the resulting pulse train signal from encoder sensor transducer 68 is transmitted to encoder sensor reader 204 whose output signal is transmitted to encoder frequency doubler 206. The output signal of frequency doubler 206 is then transmitted to the "clock" input port of phase control logic 302, the "clock" input port of start pulse timing unit 304 and the "clock" input port of stop pulse timing unit 306.

For one mode of operation, at time $t_0$, which is at the crankshaft angle desired for start of injection for the particular cylinder, a pulse is emitted by start pulse timing unit 304 activating start pulse driver 316 and triggering charge thyristor 602 (FIG. 4) to energize piezoelectric stack 62 thus closing spill valve 20 by seating poppet valve 122 against seat 130. Piston 12 of fuel injection pump 10 now begins forcing fuel into fuel injection nozzle 16.

As indicia wheel pulses are fed into phase control logic 302, start pulse timing unit 304 and stop pulse timing unit 306, engine parameter data is fed into data acquisition module 212 which converts the analog parameter signals into a digital signal which is made available to minicomputer 500.

Minicomputer 500 contains a "look-up" table of information concerning engine performance obtained from empirical tests of the engine at various speeds. The minicomputer also performs certain calculations using this empirical data such as fuel demand at idle and that required for a given fuel/air ratio.

The resulting control signal is transmitted to 8-bit latch 314 and then to phase control logic 302 as well as to interrupt latch 312 whose output signal is transmitted to the "reset" port of stop pulse timing unit 306.

The control signal reaching the "reset" port of stop pulse timing unit 306 is in the form of pulses such that when the counted pulses from encoded frequency doubler 206 equal the counted pulses from interrupt latch 312, a signal is transmitted from stop pulse timing unit 306 to stop pulse driver 318 which, in turn, transmits a signal to discharge thyristor 612 (FIG. 4) causing thyristor 612 to close and the charge from piezoelectric stack 62 to discharge through discharge inductor 618 to capacitor 624.

In an alternative mode of operation, the end or termination of injection can remain at a fixed crankshaft angle. In this case, the control pulse count ($x_0$) is first subtracted from the total duration of the constant velocity period ($y_0$) of the piston.

Figure 5:
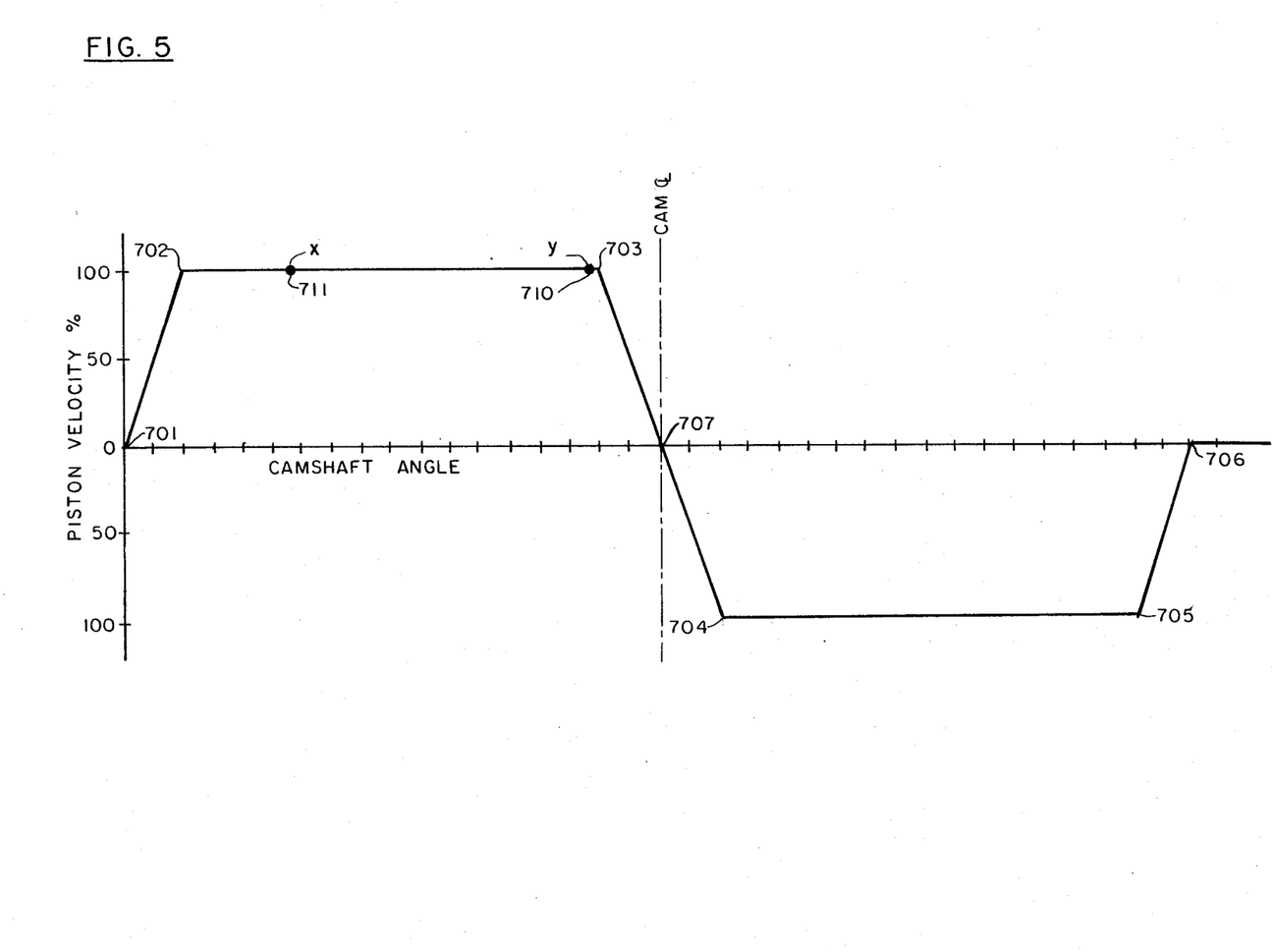
FIG. 5 is a graph of pump piston velocity as a function of the pump camshaft rotation during the pumping cycle of the fuel injection pump.

To illustrate this mode, FIG. 5 is a graph of piston velocity (ordinate) as a function of angle of camshaft rotation (abscissa).

Thus, going from point 701 to point 702, piston 12 is accelerating to its constant velocity at point 702. From point 702 to point 703, piston 12 remains at a constant velocity to discharge fuel from fuel injection pump 10. From point 703 to point 707 piston 12 is decelerated to zero velocity then accelerated in the return direction to achieve constant velocity at point 704. It continues at a constant velocity from point 704 to point 705 moving in a direction to draw fuel into cylinder 14. From point 705, piston 12 is now decelerated to zero where it remains until the cam rotates to the starting point of the next cycle for that cylinder.

The end of injection is thus noted on the graph at the ($y_0$) point 710, a point just prior to the deceleration phase of the piston's pumping stroke.

The control pulse ($x_0$) point 711 is shown at a position between point 702 and ($y_0$) point 710.

Thus when the $T_0$ pulse starts the count, and when $(y-x)_0$ have been counted, a signal from start pulse driver 316 is transmitted to start pulse driver 316 to energize piezoelectric stack 62 and close poppet valve 122.

It will be clear that in either mode of operation, the maximum injection duration will be from point 702 to point 703 on the graph of FIG. 5 and the timing of start of injection at maximum fuel will be identical for both modes of operation.

In further explanation of the operation of the circuits of FIGS. 2, 3 and 4, as previously described, the control signal output can be derived from engine operating parameters in a number of ways.

The objective is to provide a fuel/air mixture that is more or less constant over a speed range of the engine dependent upon the engine's throttle (driver's control) being in one of three positions, namely, wide open, intermediate or closed.

In the wide open state, maximum power is demanded and maximum power mixture is required.

At part-throttle, maximum power output is not required and a leaner, more efficient and economical fuel/air mixture can be utilized.

With closed throttle at high engine speeds, no power is required from the engine and fuel may be completely cut off, while at low speeds—those appropriate to idling or no load condition—sufficient mixture strength must be maintained to keep the engine running against its own friction. The fuel/charge air ratio in this condition depends upon the degree of exhaust dilution and may be quite unique to this narrow band of operation.

The principal parameter for determining fuel required to maintain a given fuel/air ration is obviously air mass flow. However, while an efficient air mass flow meter would provide an appropriate signal, there are considerations in high output engines that discourage the use of currently developed air meters.

Another approach to deriving a measure of air mass flow, described by way of example but by no means limiting the application of the present invention, is to infer mass flow by sensing those parameters influenced by or influencing trapped air charged in the cylinders. These parameters include inlet manifold air pressure, inlet air temperature, engine speed, exhaust back pressure and rate of change of throttle position.

A fundamental signal is produced as an analog voltage by combining the output of an absolute pressure sensor and a temperature sensor both situated in the inlet manifold of the engine. The outputs are so scaled that they represent density of air immediately upstream of the engine's intake valve. An analog divider 222 (FIG. 2) is employed to convert the temperature signal from inlet temperature transducer 74 to an absolute value and perform a simple calculation of constant k times $P_i/T_i$ where $P_i$ is the absolute inlet air pressure and $T_i$ is the absolute inlet air temperature.

The output of analog divider 222 is then a voltage representation of the theoretical fuel required by the engine to provide a fuel/air ratio by maintaining a linear relationship between fuel volume/stroke command signal and inlet manifold air density. In the present invention, the output of analog divider 22 is fed to mixture trim 402 (FIG. 3) for adjustment with the output signal voltage from mixture trim 402 being fed to the "fuel" input port of data acquisition module 212.

It should be noted, however, that this theoretical relationship makes the broad assumption that the engine always requires the same air/fuel ratio, that it always ingests a swept volume of air at inlet manifold density, that there are no pressure wave pulsations in the inlet or exhaust systems, that the flow coefficients of the valves do not vary, that the engine ingests air only from the inlet (not exhaust) and, in the case of a pressure charged engine, that no scavenge flow occurs.

These assumptions are clearly too broad to give accurate air measurement and consequently the parameters of engine speed, exhaust back pressure and rate of change of inlet air pressure are consulted to produce a series of correction factors.

This process is performed in minicomputer 500 in which data obtained empirically from dynamometer and chassis testing are programmed into "look-up tables". These tables produce factors that correct the theoretical fuel requirement to the actual requirement determined necessary by testing at unique combinations of observed parameters.

The control electronic circuits that accomplish this process are illustrated in FIGS. 3 and 4.

As previously described, the principal inputs (i.e. inlet manifold pressure and inlet air temperature) detected by inlet pressure transducer 72 and inlet air temperature transducer 74 are transmitted to the "N" and "D"ports, respectively, of analog divider 222 with the output signal transmitted to data acquisition module 212 through mixture trim 304.

Analog divider 222 manipulates the inputs to produce a signal representing theoretical fuel requirements. This signal is adjusted by a manual setting of mixture trim 402 by adjustment of variable resistor or potentiometer 406. Potentiometer 406 provides a means for varying air/fuel ratio. The resulting signal is still theoretical and is fed into data acquisition module 212 and held for further processing by minicomputer 500.

The parameter of engine speed is derived from RPM converter 218 which information is also fed to the "RPM" port of data acquisition module 212 to be held for further processing by minicomputer 500. The RPM signal is also fed to overrun cutoff comparator 210 where, at a combination of high RPM and closed throttle, a signal is transmitted from overrun cutoff comparator 210 to overrun cutoff latch 308 which, in turn, transmits a signal to the "output enable" port of start pulse timing unit 304 to disable the operation of start pulse timing unit 304.

The signals from throttle position transducer 76 and exhaust back pressure transducer 70 are also transmitted to data acquisition module 212 and held for processing by minicomputer 500.

To process the data in data acquisition module 212 minicomputer 500 uses a computing element common in the art, in particular, a Z80 based standard bus circuit board utilizing an integrated circuit element manufactured by Prolog, typically the Prolog 7803A, Z80 based circuit board with a capacity of 4K of random access memory and 8K of programmable read only memory.

Minicomputer 500 interfaces with the other elements of pump control unit 60 through interface 310, 8-bit databus 316 and on-maskable interrupt request (NMIRQ) line 502 connected to interrupt latch 312.

Address bits $A_0$ and $A_1$ from minicomputer 500 are connected to the input side of interface module 312 and are used to select any one of four outputs which control data acquisition module 212 in order to transfer data to injection and timing module 300. The address schedule is as follows:

TABLE 1

| $A_0$ | $A_1$ | Function | Description |
|---|---|---|---|
| 0 | 0 | WR ADDR0 | Loads sensor address on data bus and initiates data acquisition conversion. |
| 1 | 0 | RD ADDR1 | Monitors end of conversion status on data bus 316. |
| 0 | 1 | RD ADDR2 | Places converted sensor data on data bus 316 for transfer to memory. |
| 1 | 1 | WR ADDR3 | Transfers fuel count to 8-bit latch 314 in injection and timing module 300. |

These control functions may only be activated if interface module 310 receives the proper enabling signals.

When addressing a peripheral, such as, data acquisition module 212, minicomputer 500 issues an input/output request (IORQ) along with a read (RD) or write (WR) signal, depending on whether data is being sent to a peripheral (WR) or is being read from a peripheral (RD).

When ready to receive an update of fuel quantity (once each revolution of the camshaft), the non-maskable interrupt request (NMIRQ) control is activated and the fuel quantity calculated since the last interrupt request is immediately loaded onto data bus 316 and 8-bit latch 314 is activated to enter the data into phase control logic unit 302 using ADDR3 command. Minicomputer 500 then sequentially addresses and acquires data accumulated in data acquisition module 212 from each sensor and compares the data with the "look-up tables" in its memory. These data are compared to the sensor information obtained in real time for computation in the minicomputer. Based on this data, a multiplication factor is obtained to "trim" the basic fuel quantity obtained from analog divider 222 to fit those particular conditions. This adjusted fuel quantity is then stored in memory until the next interrupt is received from the timing circuit.

Thus is described a fuel injection system for an internal combustion engine.

I claim:

1. A fuel injection control system comprising
    an internal combustion engine having a crankshaft,
    a fuel supply,
    a spill valve in fluid communication with said fuel supply,
    a fuel injection nozzle,
    a fuel pump comprising
    a piston and cylinder, said cylinder in fluid communication with said fuel injection nozzle and said spill valve,
    means for actuating said fuel pump piston comprises
    means for actuating said fuel pump piston to achieve a constant velocity relative to angular rotation of said crankshaft for said piston during the delivery portion of the pumpstroke during the travel of the piston in said cylinder,
    means for closing said spill valve when said piston, during the delivery portion of the pumpstroke, reaches a first predetermined position in said fuel pump cylinder and opening said spill valve when said piston, during the delivery portion, reaches a second predetermined position in said fuel pump cylinder.

2. The fuel injection system as claimed in claim 1 wherein said means for opening said spill valve when said piston reaches a first predetermined position in said fuel pump cylinder and closing said spill valve when said piston reaches a second predetermined position in said fuel pump cylinder comprises
    a crankshaft index wheel connected to said crankshaft,
    means for detecting units of angular rotation of said crankshaft index wheel relative to an initial starting position,
    means for closing said spill valve at a first predetermined angular position of said crankshaft index wheel,
    means for opening said spill valve at a second predetermined angular position of said crankshaft index wheel.

3. The fuel injection system as claimed in claim 1 wherein said means for opening said spill valve when said piston reaches a first predetermined position in said fuel pump cylinder and closing said spill valve when said piston reaches a second predetermined position in said fuel pump cylinder comprises
    means for detecting the position of said fuel pump piston in said cylinder comprising
    means for detecting an initial piston position,
    means for measuring the position of said piston from said initial position,
    a pump control unit comprising
    a signal condition and conversion module,
    a computer,
    a remote monitor module, and
    an initial piston position sensor transducer electrically connected to said means for detecting the initial position of said piston,
    a data acquisition module connected to said means for measuring the position of said piston from said initial position sensor transducer,
    means for measuring exhaust pressure connected to said data acquisition module,
    means for measuring inlet air pressure connected to said data acquisition module, means for measuring inlet air temperature connected to said data acquisition module, means for measuring throttle position connected to said data acquisition module, an injection and timing module, said signal condition and conversion module connected to said data acquisition module, said computer and said initial piston position sensor transducer said injection and timing module comprising means for energizing and deenergizing said spill valve at predetermine positions of said fuel pump piston based on a predetermined conditions dictated by exhaust pressure, inlet air pressure, inlet air temperature and throttle position.

4. a fuel injection control system comprising:

an internal combustion engine having a crankshaft, a fuel supply, a spill valve in fluid communication with said fuel supply, a fuel injection nozzle a fuel pump comprising:

a piston and cylinder, said cylinder in fluid communication with said fuel injection nozzle and said spill valve, means for actuating said fuel pump piston comprising:

a cam drive shaft connected to said engine drive shaft, a cam attached to said cam drive shaft, said cam having a substantial portion with a radius which increases at a constant rate per angle of rotation of the cam, a cam follower adapted to engage said cam and actuate said fuel pump piston and to move at a constant velocity when in contact with the constant rate portions of the cam, means for measuring the angular rotation of the cam thereby determining the position of said fuel pump piston in said cylinder, a pump control unit comprising:

means for opening said spill valve when during the delivery portion of the pumpstroke said cam has rotated a predetermined amount whereby said piston reaches a first predetermined position withhin said fuel pump cylinder, and means for closing said spill valve when during the delivery portion of the pumpstroke said cam has rotated a predetermined amount whereby said piston has reached a second predetermined position within said fuel pump cylinder.

5. A fuel injection control system comprising an internal combustion engine having a crankshaft, a fuel supply, a spill valve in fluid communication with said fuel supply, a fuel injection nozzle, a fuel pump comprising a piston and cylinder, said cylinder in fluid communication with said fuel injection nozzle and said spill valve, means for actuating said fuel pump piston comprising a cam dirve shaft connected to said engine drive shaft, an index wheel connected to said cam shaft, a cam attached to said cam drive shaft, said cam comprising a cam contour adapted to produce a constant volume of fuel per unit of angular rotation of said index wheel, a cam follower adapted to engage said cam and actuate said fuel pump piston, means for detecting degrees of rotation of said index wheel, means for detecting a zero position corresponding to the beginning of an engine cycle on said index wheel, a pump control unit comprising means for measuring an angular position from said zero position, means for opening said spill valve at a predetermined angular position of said index wheel, means for closing said spill valve at a predetermined angular position of said index wheel.

6. A process for injecting fluid into a receiving receptacle comprising the steps of filling the cylinder of a fluid pump, which is in fluid communication with a fluid receiving receptacle and an electronically controlled spill valve, with an incompressible fluid from a fluid supply, opening said spill valve to allow fluid to return to said fluid supply and not to pass to said fluid receiving receptacle, actuating the piston of said fluid injection pump at a constant velocity to displace said fluid and pump said fluid out of said cylinder, measuring the distance said piston travels in said cylinder, closing said spill valve when said piston reaches a first predetermined position in said cylinder to pressurize said fluid and cause said fluid to be ejected into said fluid receiving receptacle, opening said spill valve when said piston reaches a second predetermine position in said cylinder to release pressure in said fluid pump and return fluid to said fluid supply.

* * * * *